United States Patent [19]
Allen

[11] Patent Number: 5,595,311
[45] Date of Patent: Jan. 21, 1997

[54] STORAGE RACK SYSTEM

[75] Inventor: Donald R. Allen, Long Valley, N.J.

[73] Assignee: Frazier Industrial Company, Long Valley, N.J.

[21] Appl. No.: 393,221

[22] Filed: Feb. 13, 1995

[51] Int. Cl.⁶ ............................................. A47F 5/00
[52] U.S. Cl. ....................... 211/151; 211/59.2; 414/276
[58] Field of Search ......................... 211/59.2, 151; 414/276, 286

[56] References Cited

U.S. PATENT DOCUMENTS

| | | | |
|---|---|---|---|
| 4,341,313 | 7/1982 | Döring | 211/151 |
| 4,773,546 | 9/1988 | Konstant | 211/151 |
| 4,949,852 | 8/1990 | Allen | 211/151 |
| 4,955,489 | 9/1990 | Allen | 211/151 |
| 5,184,738 | 2/1993 | Allen | 211/151 |
| 5,328,038 | 7/1994 | Allen | 211/151 |

Primary Examiner—Robert W. Gibson, Jr.
Attorney, Agent, or Firm—Joseph W. Molasky & Associates

[57] ABSTRACT

A storage rack system having a plurality of storage bays adapted to store pallet loads that are three and four pallets deep is disclosed. This system includes a pair of outer tracks and a pair of spaced apart inner tracks located within the outer tracks and extending the full depth of the storage rack. One of the inner tracks is secured to a spaced apart adjacent outer track by a plurality of brackets to form a first independent unit, and the other of the inner tracks is secured to a spaced apart adjacent outer track by a plurality of brackets to form a second unit.

28 Claims, 11 Drawing Sheets

STORAGE RACK SYSTEM

BACKGROUND OF THE INVENTION

1. Field of the Invention

This invention relates to a storage rack system in which goods are loaded onto pallets which are moved by lift trucks and, more particularly, to a storage rack system of the push-back type.

2. Description of the Prior Art

Two-deep push-back systems have been in use since the late 1950's, whereas, three-deep and four-deep systems are of more recent vintage. Typical of these are the systems issued to D. Allen in U.S. Pat. Nos. 4,955,489; 4,949,852; and 5,184,738.

In U.S. Pat. No. 4,955,489, there is described a storage rack system of the push-back type; whereas, U.S. Pat. No. 4,949,852 covers a three-deep and four-deep system having a double cart assembly wherein a large cart rides on the tracks and a small cart is movably mounted onto a large cart.

U.S. Pat. No. 5,184,738 covers a storage rack system adapted to store pallet loads that are three, four, and five pallets deep.

Basic to all of these is the pioneer storage rack systems covered by U.S. Pat. No. 4,341,313 issued to E. Döring.

Another system of interest is the three pallet assembly covered by A. Konstant in U.S. Pat. No. 4,773,546.

In this system, the carts ride on the lower flange surfaces of parallel I-beams. More particularly, two pairs of I-beams are arranged to provide a pair of inwardly facing flanges for one track, whereas, the outwardly facing flanges provide the other track so that an upper cart may ride on one of the tracks while a lower cart rides on the other. Each I-beam is supported by an interior shelf beam to which it is secured by brackets.

However, the Konstant system is not without its disadvantages. For one, the I-beam flanges are not only narrow and provide little track means but the I-beams extend linearly over a considerable distance due to the fact that commercially available I-beams are used. The disadvantage is that I-beams have a tendency to roll and become distorted and twist to some degree.

If this distortion were not compensated for, the wheels of the carts would come into contact with the web of the I-beam as they move along the tracks, and this would impede their movement and lead eventually to wheel failure. It is for this reason that Konstant secures the I-beams to interior shelf beams shelf beams by the use of brackets.

Still, the sloped surfaces of the I-beam flanges create other problems. For example, the cart wheels are required to roll at an angle, that is, they roll on a sloped surface, not a flat surface. As a result, there is a tendency for the wheels to ride up the flange in the direction of the I-beam web where they engage both the upper and lower flange surfaces and become wedged.

SUMMARY OF THE INVENTION

The present invention solves the problems associated with the Konstant assembly by providing a first pair of spaced-apart inner tracks and a second pair of spaced apart outer tracks, each having an inwardly extending C-shaped channel structure. One inner track is secured to an adjacent but spaced apart outer track by a plurality of brackets to form a first independent track unit. Similarly, the other one of the inner tracks is secured to an adjacent but spaced apart outer track by a plurality of brackets to form a second independent unit. These units are mounted onto the horizontal shelf beams by bolts.

This arrangement minimizes and to a large extent eliminates the rolling and twisting of the track members. First, the longer width bracket provides a larger base for added stability. Also, since the straight track members are secured to the brackets before being mounted onto the shelf beams, there is less likelihood that they will twist or bend when mounted onto the shelf beams.

Moreover, the inner and outer tracks are more economical because they cost less to fabricate and install than I-beams.

In a three-deep system, an upper and lower cart with front and rear wheels is provided. The lower cart rides along the inner tracks and the second cart rides along the outer tracks for movement between front and rear positions.

In a four-deep system, there is provided an additional middle cart for storing a pallet load at the two deep position. The rails are extended further and the plate on the upper cart is raised so that the upper cart can pass over the two lower carts. The lower cart has its front and rear wheels adapted to ride along the inner tracks. The middle cart has its front wheels adapted to ride along the outer tracks and the rear wheels are adapted to ride on the inner track. The upper cart has its front and rear wheels adapted to ride along the outer tracks. Each of the carts move along the depth of the storage bay between a forward and a back position.

It is an object of the invention to provide a storage rack system for storing pallet loads multiple pallets deep and to do so in an economical and time-saving manner.

It is a further object to provide a storage rack system which employs a track means that is stable, easy to install, and essentially maintenance free.

Another object is to provide a storage rack system which can be constructed from commercially available structural steel components.

DETAILED DESCRIPTION OF THE PREFERRED EMBODIMENTS

In FIGS. 1–7 there is shown a storage rack system in accordance with the invention adapted to store pallet loads three pallets deep. This system comprises a plurality of storage bays each of which is defined by a plurality of uprights and horizontal shelf beams constructed and arranged in a generally conventional arrangement, the framework of which is shown in more detail in U.S. Pat. Nos. 4,494,852 and 4,955,489.

Each of the storage bays is of a depth sufficient to accommodate two rows of pallets. This is accomplished by providing five vertically extending upright frames indicated at 10, 11, and 12, each of which is comprised of a pair of upright columns joined by horizontally extending ties and, where needed, cross brace members. Each of the right side upright frames 10–12 is connected with a corresponding upright frame 10'–12' on the left side of a storage bay by means of a plurality of horizontal shelf beams including a front shelf beam 15, four interior shelf beams 16A, 16B and a rear shelf beam 17. The interior shelf beams 16A, 16B are connected by means of bolts and connectors at their ends with aligned columns of the upright frames 10–12 and 10'–12'. This connection design is conventional, the arrangement of the upright frames and horizontal shelf beams being described in detail in said prior patents, and serves to provide support means for the pallets containing the stored loads and to support the track means and carts for positioning the pallet loads in the storage bays. It will be apparent that each storage bay is of a size sufficient to contain as many as two rows of pallets each three deep.

For each row of pallets, there is provided a track means extending along the depth of the storage bay. In the case of the three deep system shown in FIGS. 1–7, wherein there are provided two carts, the track means comprises two parallel pairs of associated tracks, namely, a pair of inner tracks 21a and 21b and a pair of outer tracks 22a and 22b. The tracks extend from the front to the back of the storage bay along the entire depth thereof. The tracks 21a, 21b and 22a, 22b are spaced apart and supported on the interior shelf beams 16A and 16B by a plurality of brackets as will be explained later in more detail.

Figure 5:
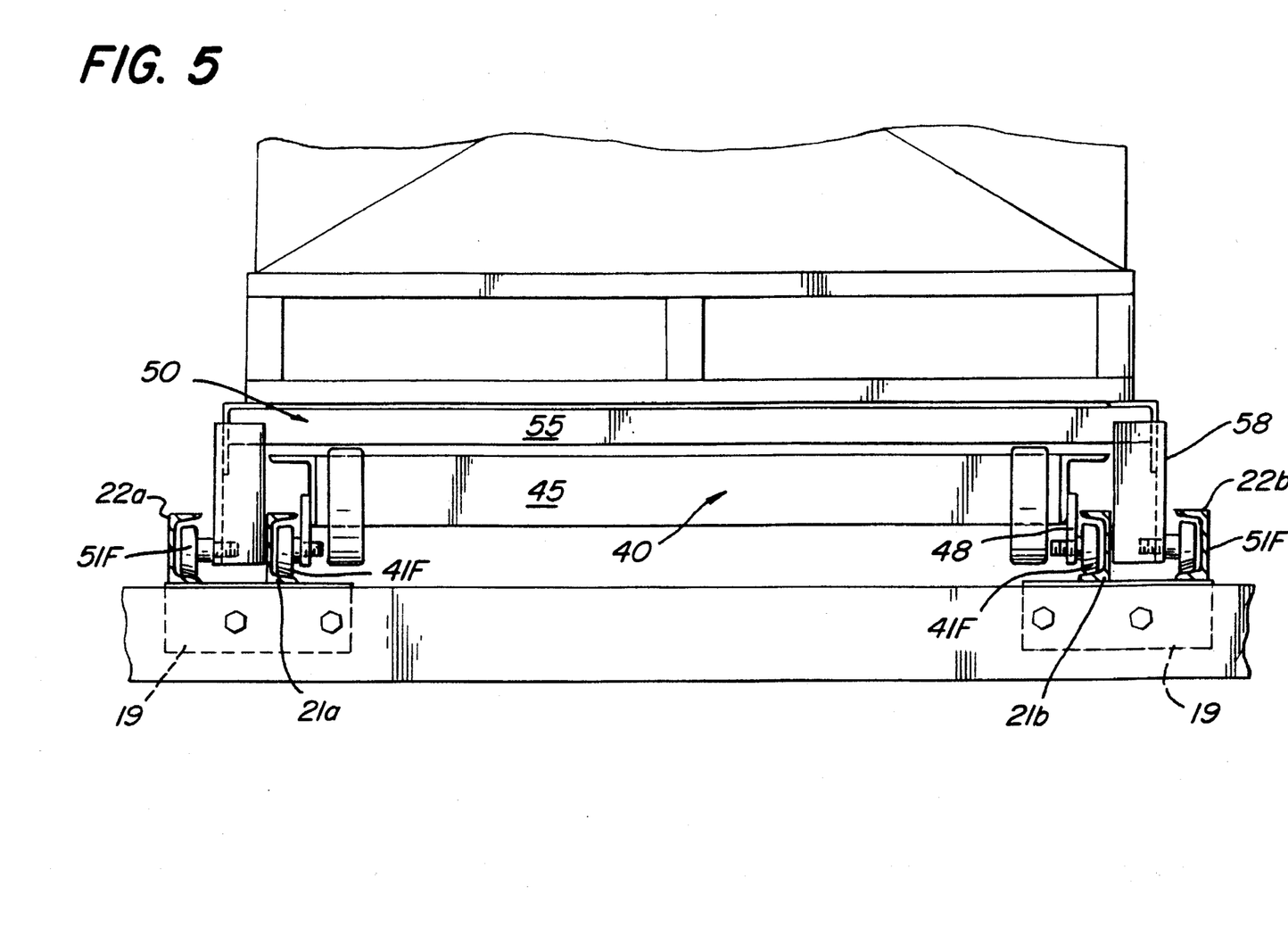
FIG. 5 is a front end view of FIG. 3.
Figure 15:
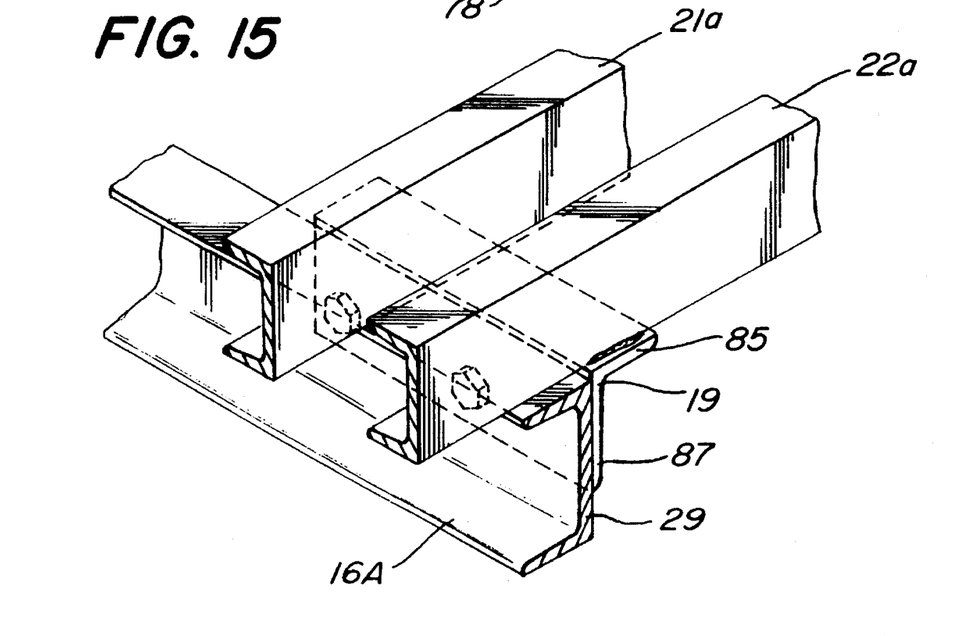
FIG. 15 is a detail view showing the support for the track means.
Figures 16A, 16B:
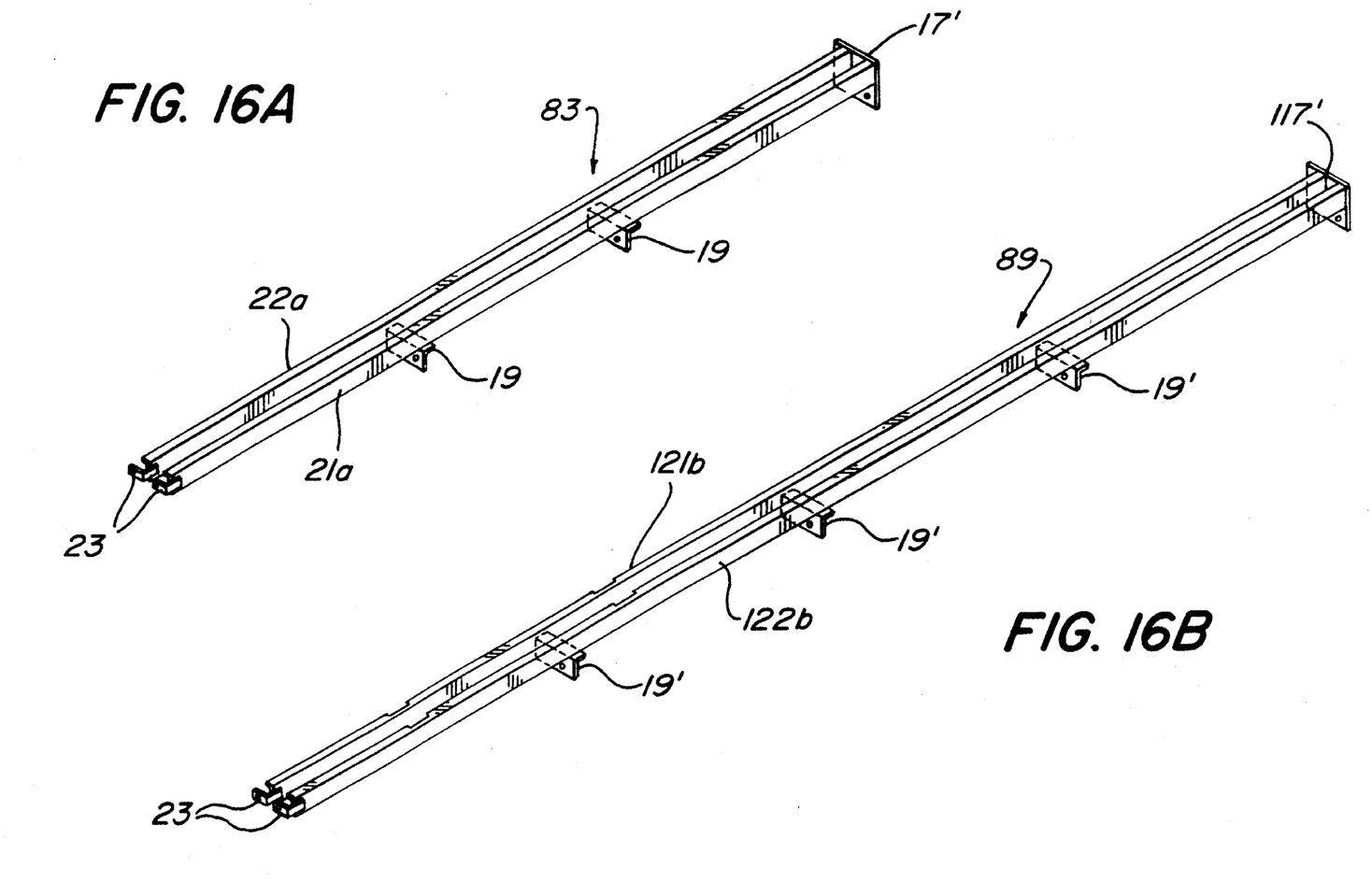
FIG. 16A is a perspective view of an independent track unit for a three deep system.
FIG. 16B is a perspective view of an independent track unit for a four deep system.

The inner tracks 21a and 21b are each provided by a structural member having a C-shaped cross section, each being arranged to provide inwardly facing upper and lower flanges. The outer tracks 22a and 22b are also each provided by a structural member having a C-shaped cross section, each being arranged to provide inwardly facing flanges. As depicted in FIG. 16A, inner track 21a is secured to the spaced apart adjacent outer tracks 22a by a plurality of angle brackets 19 to form a first independent track unit 83. Similarly, the other inner track 21b is secured to the spaced apart adjacent outer track 22b by a plurality of angle brackets 19 to form a second independent unit 83. In more detail, inner and outer tracks of each unit are welded to the top of the horizontal upper portion 85 of the angle brackets 19 as depicted in FIG. 15. The unit is then mounted onto the interior shelf beams 16A and 16B such that the lower portion 87 of an angle bracket 19 is mounted to the rear surface of the interior shelf beam 16A or 16B. As seen in FIGS. 5 and 15, such mounting means includes two bolts extending through holes in the angle bracket 19 and aligned prepunched holes in the associated shelf beam 16A, 16B.

Each structural member providing tracks 21a, 21b and 22a, 22b of the track means is supported on and secured to the front and rear shelf beams 15 and 17 in a conventional manner as known in the art and described in detail in said prior patents. Briefly, each of the C-shaped structural members providing tracks 21a, 21b and 22a, 22b is secured to front shelf beam 15 by means of angle brackets 23 and associated bolts and mounted to the rear shelf beam 17 so that the C-shaped structural members run over the top thereof and are secured thereto by the use of a plate 17' that runs behind the structural members and the rear shelf beam 17 as is discussed in the prior patents.

Figure 1:
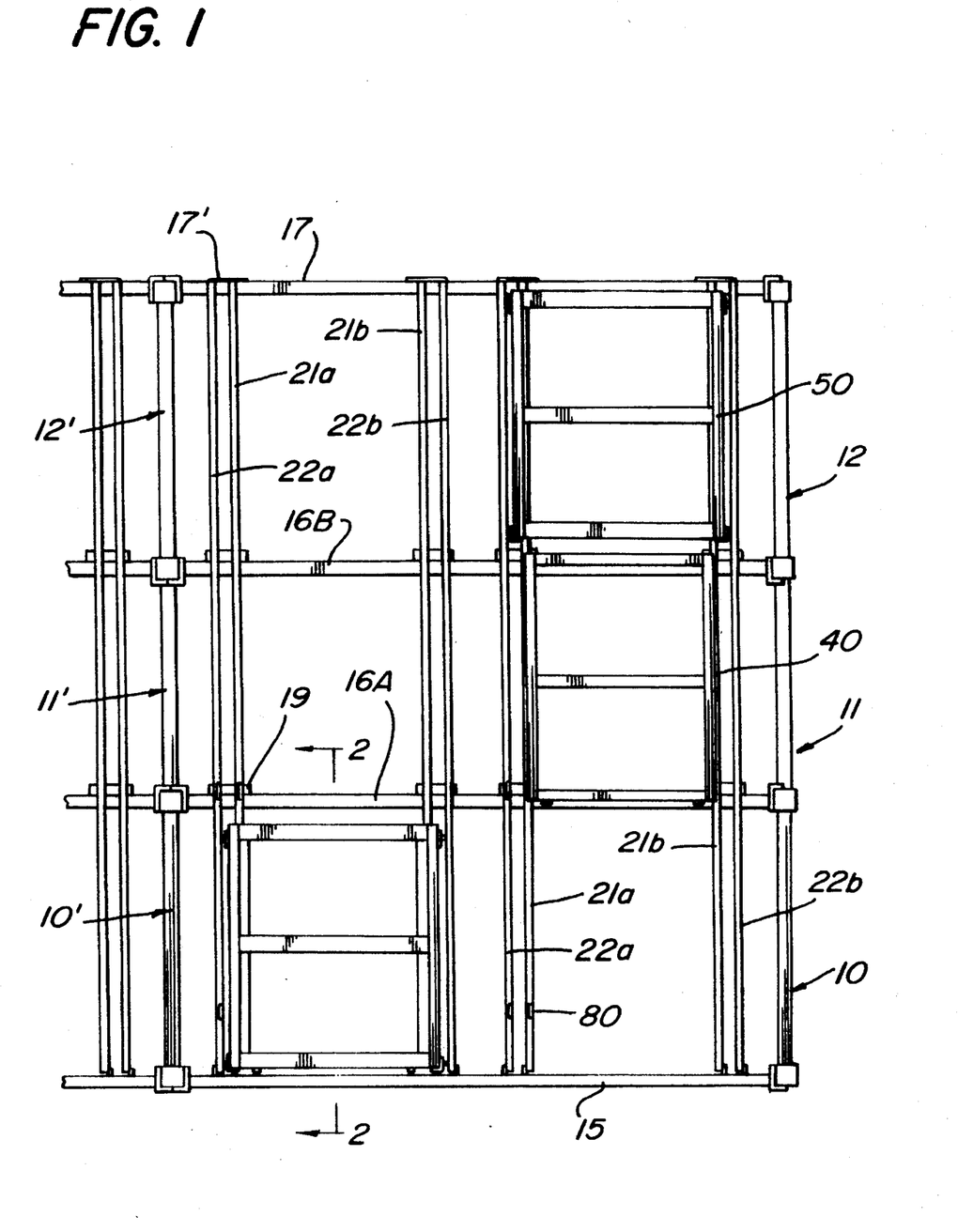
FIG. 1 is a plan view of a three-deep storage rack system in accordance with this invention.

In the three deep system in accordance with the invention shown in FIGS. 1–7, there are provided an upper and lower cart 40, 50, which are adapted to ride on the track means comprising the two pairs of tracks 21a, 21b and 22a, 22b, as discussed above, for movement along the depth of the storage bay as will be described in detail hereafter. Briefly stated, each of the carts 40, 50 is mounted for movement along the track means between a forward position and a back position. Referring to FIG. 1, the forward position of each of the carts 40, 50 is shown in the left hand row of the storage bay shown in this figure, and the back positions of the carts is shown in the right hand row of the storage bay shown in this figure.

Figure 6:
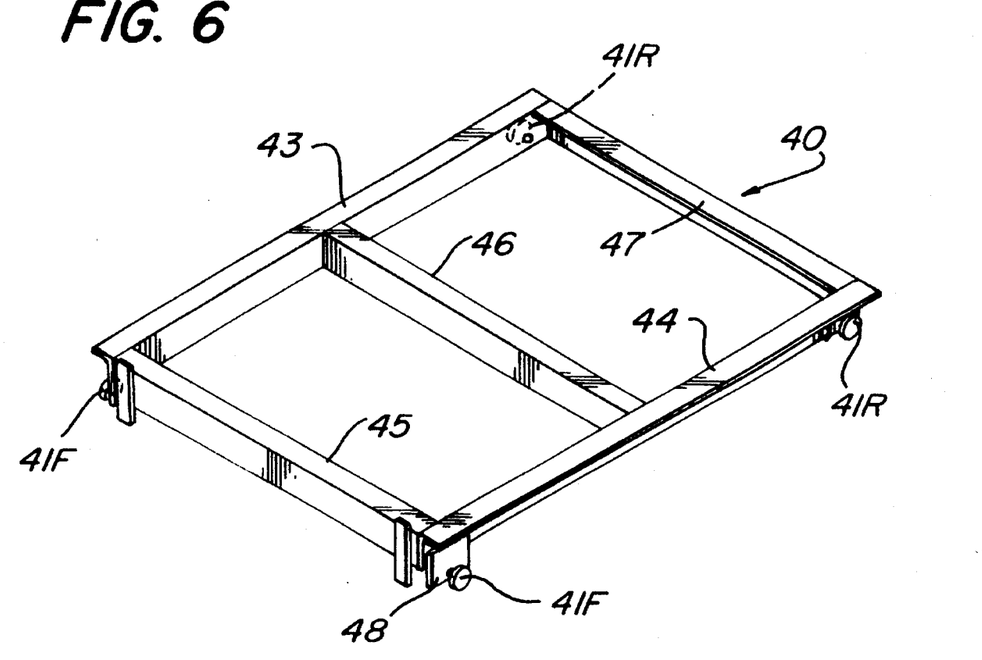
FIGS. 6 and 7 are detail views of carts used in this invention.
Figure 7:
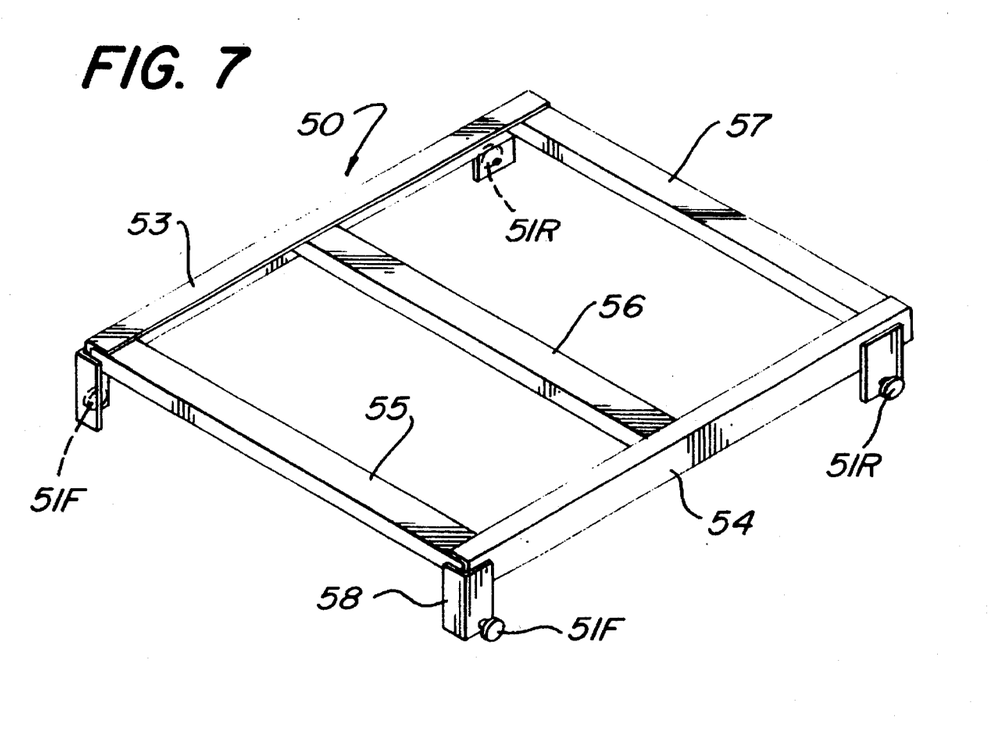

The lower cart 40 includes a rectangular frame formed of a plurality of structural members welded together and best shown in FIG. 7. The frame of cart 40 comprises a pair of side structural angles 43 and 44, a front structural angle 45, a middle structural angle 46, and a rear structural angle 47. Middle angle 46 and rear angle 47 extend between and are welded at their ends to side angles 43 and 44. Two pairs of vertical plates 48 are welded to the outer ends of side angles 43, 44 at front and rear locations as shown in FIG. 6 to provide each pair for supporting their respective front and rear wheel assemblies 41F and 41R of cart 40. There are provided two bearing-type wheel assemblies mounted on each side of the front frame at the front and rear ends thereof to provide four rolling supports for cart 40, the front wheel assembly on each side being indicated at 41F and the rear wheel assembly being indicated at 41R. The construction of the wheel assemblies 41F and 41R and their mounting on the first cart frame will be described more fully hereafter. As best shown in FIG. 5, the front and rear wheels 41F, 41R ride on the inwardly facing tapered bottom flange portions of the C-shaped structural member forming the inner tracks 21a, 21b. The frame for cart 40 is of a size so as to support a pallet load, as indicated by the pallet load B in the arrangement shown in FIG. 3.

Figure 2:
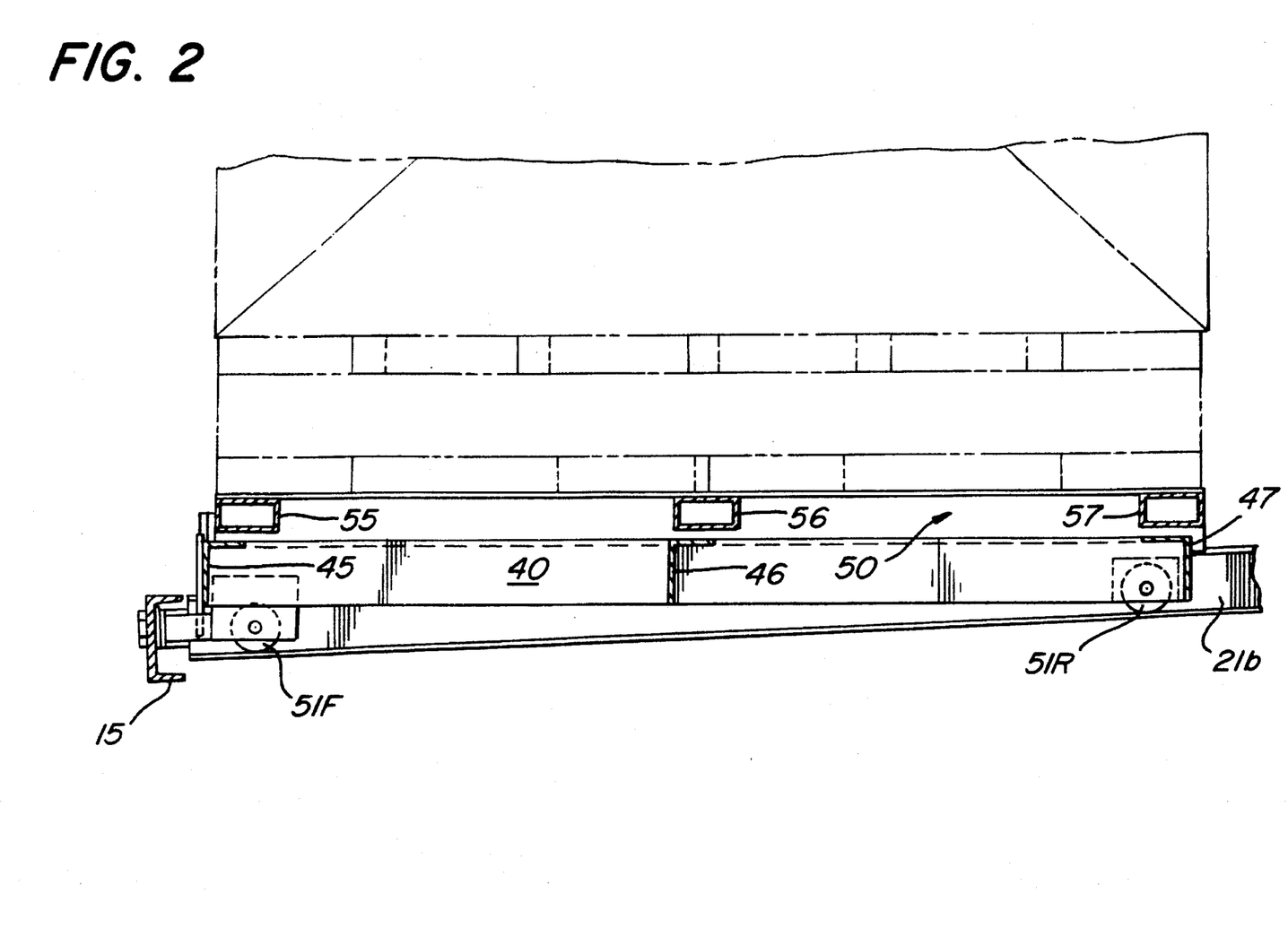
FIG. 2 is a section taken on line 2—2 of FIG. 1.

The upper cart 50 is manufactured as an independent unit and includes a rectangular frame for providing support for a loaded pallet, a plurality of wheel assemblies 51F and 51R on each side of the cart frame, and means for supporting each of the wheel assemblies 51F, 51R to make rolling contact with the outer tracks 22a, 22b as cart moves along the depth of the storage bay between a forward and a back position. Second cart 50 includes a rectangular frame formed of five structural members welded together as best shown in FIG. 7. Cart 50 comprises a pair of side tubes 53 and 54, a front tube 55, a middle channel 56 and rear tube 57. A pair of bearing-type wheel assemblies 51F and 51R are mounted at the front and rear ends of side tubes 53 and 54 so as to provide four rolling supports for the second cart 50. The second cart wheel assemblies 51F and 51R ride on the inwardly facing tapered bottom flange portions of the C-shaped structural members forming the pair of outer tracks 22a, 22b at locations rearwardly of the front wheel assemblies 41F of the first cart 40 as shown in FIG. 2. The frame for cart 50 is of a size so as to be able to support a pallet load as indicated by the pallet load C in the arrangement shown in FIG. 3.

The wheel assemblies for the carts 40, 50 are of the same construction and are mounted on vertically extending leg portions of said carts by conventional means and in a manner as described in detail in said prior mentioned patents.

Briefly, the mounting means comprises horizontally extending holes punched in vertically extending legs of the wheel supporting brackets with each hole being used to mount a wheel assembly. Each of the wheel assemblies has a horizontally extending axle having a threaded reduced diameter portion extending on a horizontal axis through the hole in the vertically extending supporting bracket. Typically, the reduced diameter portion of the axle extends through a pair of washers on the opposite sides of said vertically extending legs and is threadedly engaged with a nut in an arrangement whereby the axle is secured in place to extend on a horizontal axis. A wheel rim is rotatably supported on a hub of the axle by means of roller bearing means positioned between the hub and the wheel rim by conventional sealed roller bearing construction. The wheel rim is formed with a tapered outer of rolling surface, the taper angle being the same as the taper angle formed on the associated bottom flange portion of the structural member forming tracks 21a, 21b and 22a, 22b. The upper cart 50 further includes a vertically extending front plate 58 integrally formed with the leg portion in which the wheel assemblies are mounted thereon. This plate acts as a stop to prevent the wheels from striking the front beam when the cart moves from the rear to forward position.

Each of the carts 40 and 50 is mounted into their associated tracks 21a, 21b and 22a, 22b in a conventional manner by the use of a pair of cut-outs formed in the upper flanges of the structural members forming said associated tracks. As is conventional, the cut-outs are located to correspond to the spacing of the wheel assemblies of said carts. Actual field insertion is achieved by a procedure well known in the art whereby the carts are tilted at an angle and the left side wheels are slipped into the left hand tracks and the cart is maneuvered so that the right-side cart wheels can then be dropped through the track cutouts in the upper flanges of the track means.

In accordance with the invention, cart 40 is arranged so that its front and rear wheel assemblies 41F and 41R ride on the tracks 21a, 21b as cart 40 moves between a forward position at the entry end of the storage bay and a back position two pallets deep from the entry end of the storage bay. Cart 50 is arranged so that both its front and rear wheel assemblies 51F and 51R are positioned to ride on the tracks 22a, 22b as cart 50 moves between a forward position at the entry end of the storage bay and a back position three pallets deep from the entry end of the storage bay.

The carts 40, and 50 are constructed and arranged so that the forward position of cart 50 overlies the forward position of cart 40.

As is described in said prior patents, there are provided suitable bumper means for holding the carts 40, and 50 in their forward position at the entry end of the storage bay.

The pairs of tracks 21a, 21b and 22a, 22b are all mounted on the shelf beams of the framework so that they extend at a slight inclination toward the entry end of the storage bay. As is described in detail in said prior patents, the inclination is achieved by the accurate locating of the position of the supporting structure for the tracks means and is typically about 5/16 inch for each 12 inches of length.

Carts 40, and 50 are constructed so that the pallet supporting top surface of each cart is maintained in a level (i.e., horizontal) position on the inclined track means for said carts. This type of cart construction is described in detail in said U.S. Pat. No. 4,955,489 with respect to FIGS. 18–19 thereof. Briefly, this is achieved by making the front wheel assemblies of a larger vertical extent than the rear wheel assemblies for each cart. In other words, the support means for the front wheel assemblies are constructed and arranged so that the front end of the top surface of the cart is spaced from the place of rolling contact with the track an amount greater than that of the rear end thereof so that said top supporting surface is maintained in a horizontal plane while a cart supported on the inclined tracks 21a, 21b and 22a, 22b rides therealong. Thus, the supporting surface of the cart remains level even though the cart moves along an inclination as it moves between its forward and back positions on the inclined tracks supporting the same.

Figure 3:
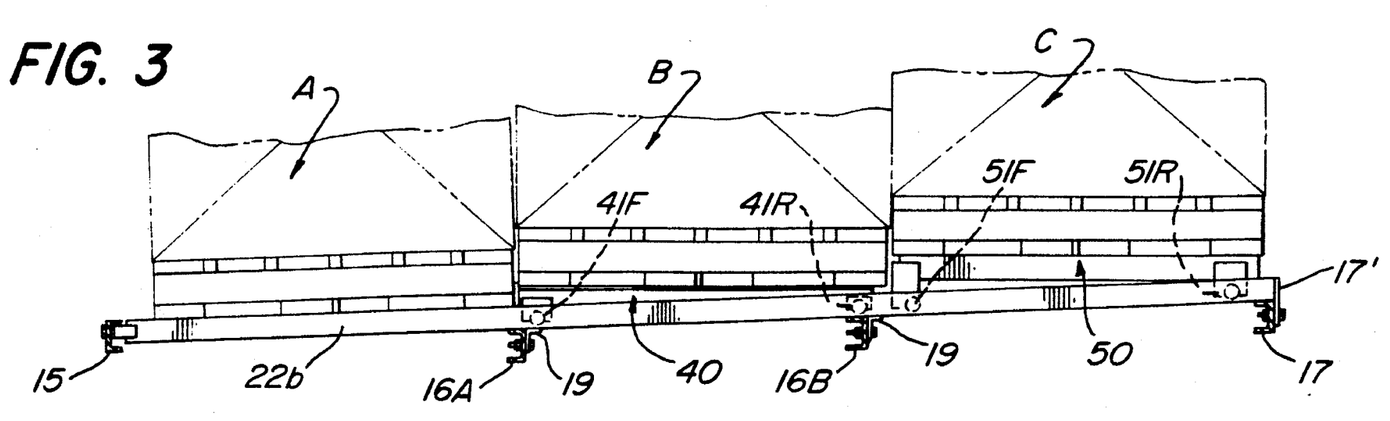
FIG. 3 a side elevation of FIG. 1.
Figure 4:
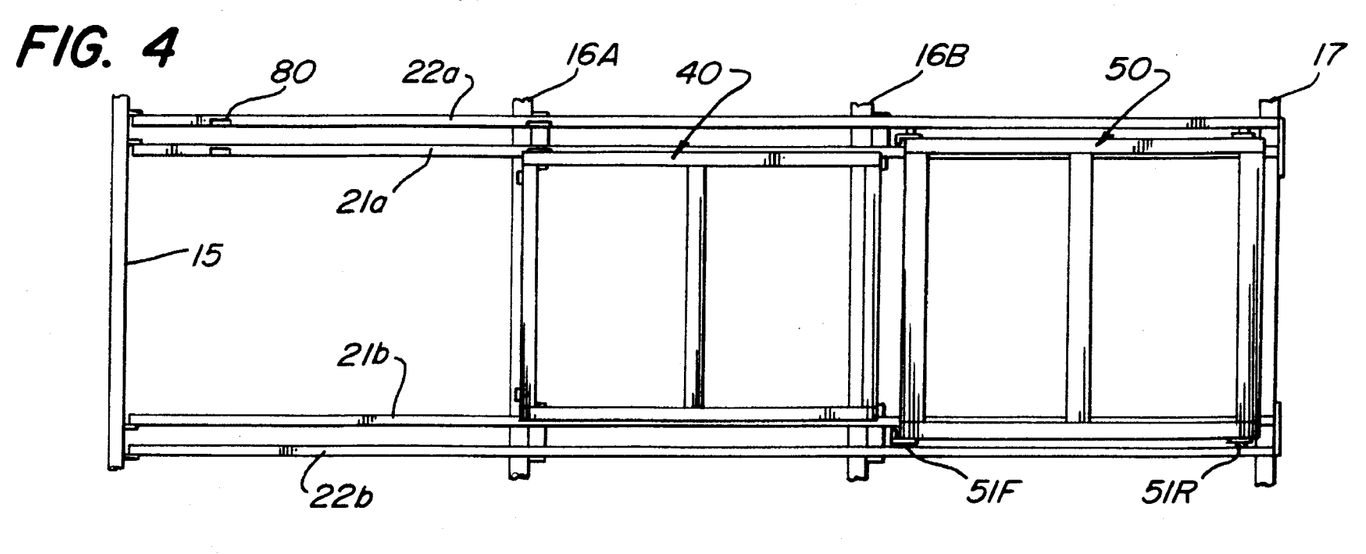
FIG. 4 is a plan view of FIG. 3.

As is apparent from a consideration of the Drawings, the forward position of the carts 40 and 50 is located at the entry end of the storage bay, the back position of the carts 40 and 50 is located to span two and three pallets deep from the entry end of the storage bay, the front position of the upper cart 50 overlies the forward half of the lower cart 40, and the rear position of the upper cart 50 overlies the back half of the lower cart 40. Thus, each row of the storage bay can store three pallet loads A, B, and C in an arrangement as best shown in FIG. 3. The front pallet supporting load A is supported on the track means 21a, 21b, the middle pallet supporting load B is supported on the front half of the lower cart 40 and the back pallet supporting load C is supported on the upper cart 50.

The pallet loads A, B, and C will be placed in the position shown in FIG. 3 by a conventional push-back loading technique employing conventional fork trucks as follows:

The fork truck carrying the pallet loads supporting the first load to be stored (load C) will approach an empty storage rack from the aisle and move through the entry end of the storage bay to place the first load onto the empty small cart 50, which has assumed its position at the entry end of the storage bay as described above. The lower cart 40 and upper cart 50 will always be positioned in their forward position when empty by reason of the mounting of the track means 21a, 21b and 22a, 22b with a slight inclination towards the entry end of the storage bay. When it is desired to store the second pallet load (load B) in the storage bay, the fork truck approaches the storage rack at an elevation such that said fork truck and the second pallet load B gently nudge the first load C toward the rear whereby said first load C and the upper cart 50 supporting the same will be pushed back rearwardly toward the rear of the storage rack up to the point where the fork truck can place the second load B onto the empty front half of the lower cart 40. When it is desired to store a third pallet load (load A), the fork truck with said third pallet load A approaches the storage rack in the same elevation as with the previous load and the fork truck with the third pallet load A thereon gently nudges the first and second pallet loads B and C supported on the upper and lower carts 50 and 40, respectively, toward the rear of the storage rack until the fork truck can leave the third pallet load A on the track means 21a, 21b and the front shelf beam 15 at the front loading position at the entry end of the storage bay. In this manner, the row of the storage rack is fully loaded with three pallet loads A, B, and C.

In order to unload the three pallet loads A, B, and C, a procedure which is essentially the reverse of the above-described procedure is employed. As soon as the forward pallet load A is removed, the pallet loads B and C on the upper cart 50 and the lower cart 40 will roll forwardly to position the front half of the lower cart 40 at the front (or pick) position. In a like manner, when pallet load B on the lower cart 40 is unloaded, this will allow pallet load C on the upper cart 50 to roll forwardly to the front (or pick) position where it can be subsequently unloaded by a fork truck as desired.

In FIGS. 8–14, there is shown a storage rack system in accordance with the invention for storing four pallets deep in each row. The storage rack system shown in FIGS. 8–14 comprises a framework which is essentially the same as that shown in FIG. 1, the main differences being that the spaces between adjacent upright frames are widened and the track means are lengthened to store four pallets deep in each row. Thus, the framework provides a plurality of storage bays each of which is defined by a plurality of vertical uprights and horizontal shelf beams constructed and arranged in a generally conventional arrangement such as the storage racks manufactured by Frazier Industrial Company. Each of these storage bays is constructed of a depth to provide storage for four pallets deep and of a width to accommodate two rows of pallets.

Figure 8:
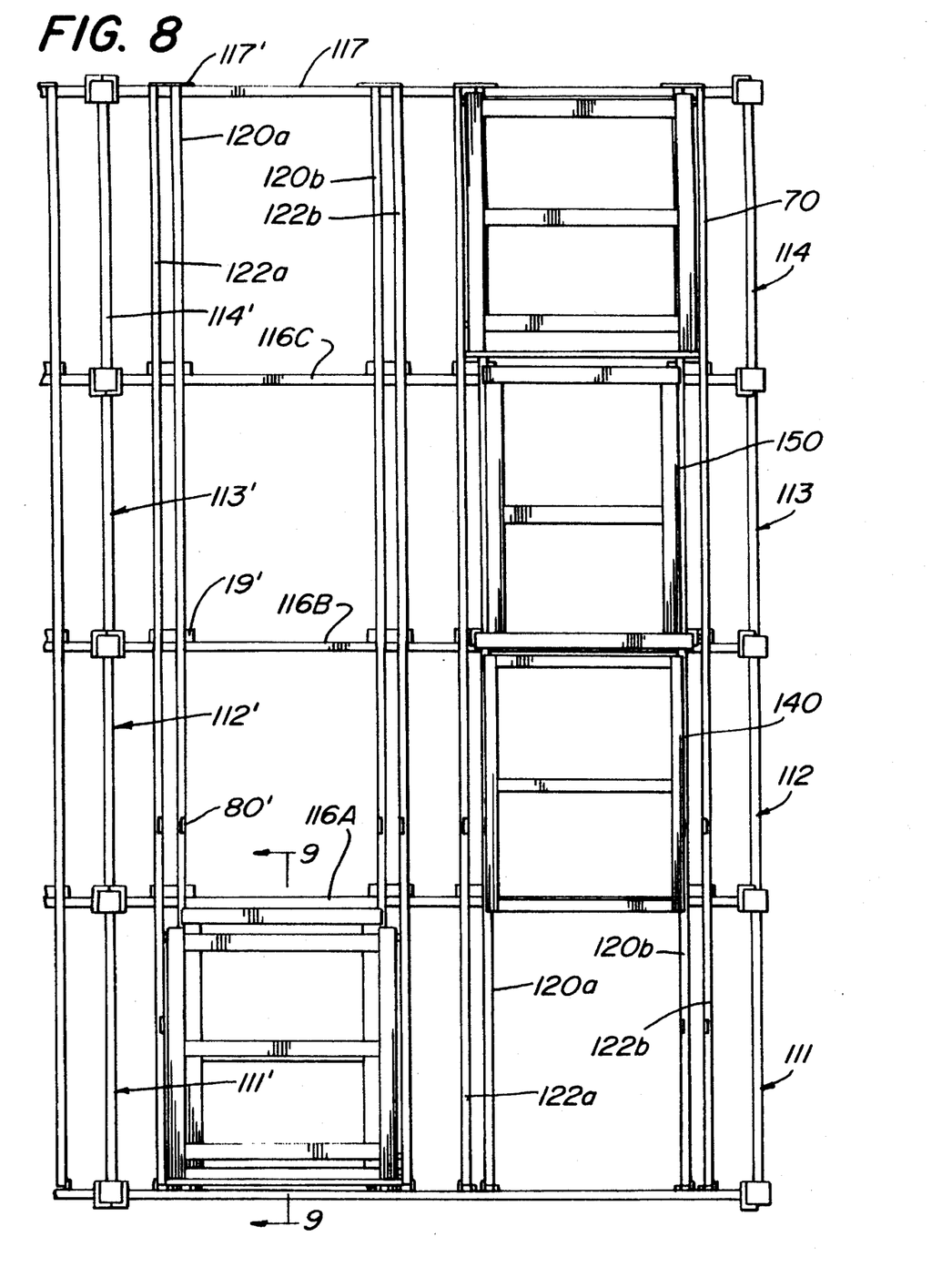
FIG. 8 is a plan view of part of a four-deep storage rack system in accordance with this invention.

There are provided four vertically extending upright frames indicated at 111, 112, 113 and 114 essentially identical to the corresponding upright frames 10, 11, 12, and 13 shown in FIG. 1. Each of the upright frames 111, 112, 113, and 114 is comprised of a pair of upright columns joined by horizontally extending ties and cross brace members, this frame structure being conventional in the art and being employed in the storage racks of Frazier Industrial Company. Each of the upright frames 111, 112, 113, and 114 shown in FIG. 8 is located on the right side of the storage bay and is connected with a corresponding upright frame on the left side of the storage bay by means of a plurality of horizontally extending shelf beams, including a front shelf beam 115, four interior shelf beams 116A–C and a rear shelf beam 117.

The interior shelf beams 116A–C are connected, by means of bolts and connectors, at their ends with aligned columns of the right side and left side upright frames 111'–114' in the same manner as described above with respect to the storage rack system shown in FIG. 1. This connection design is conventional, the arrangement of the upright frames and horizontal shelf beams being described in detail in said prior patents, and serves to provide support means for the pallets containing the stored loads and to support the track means and carts for positioning the pallet loads in the storage bays. It will be apparent that each storage bay is of a size to contain as many as two rows of pallets each four deep.

Figure 11:
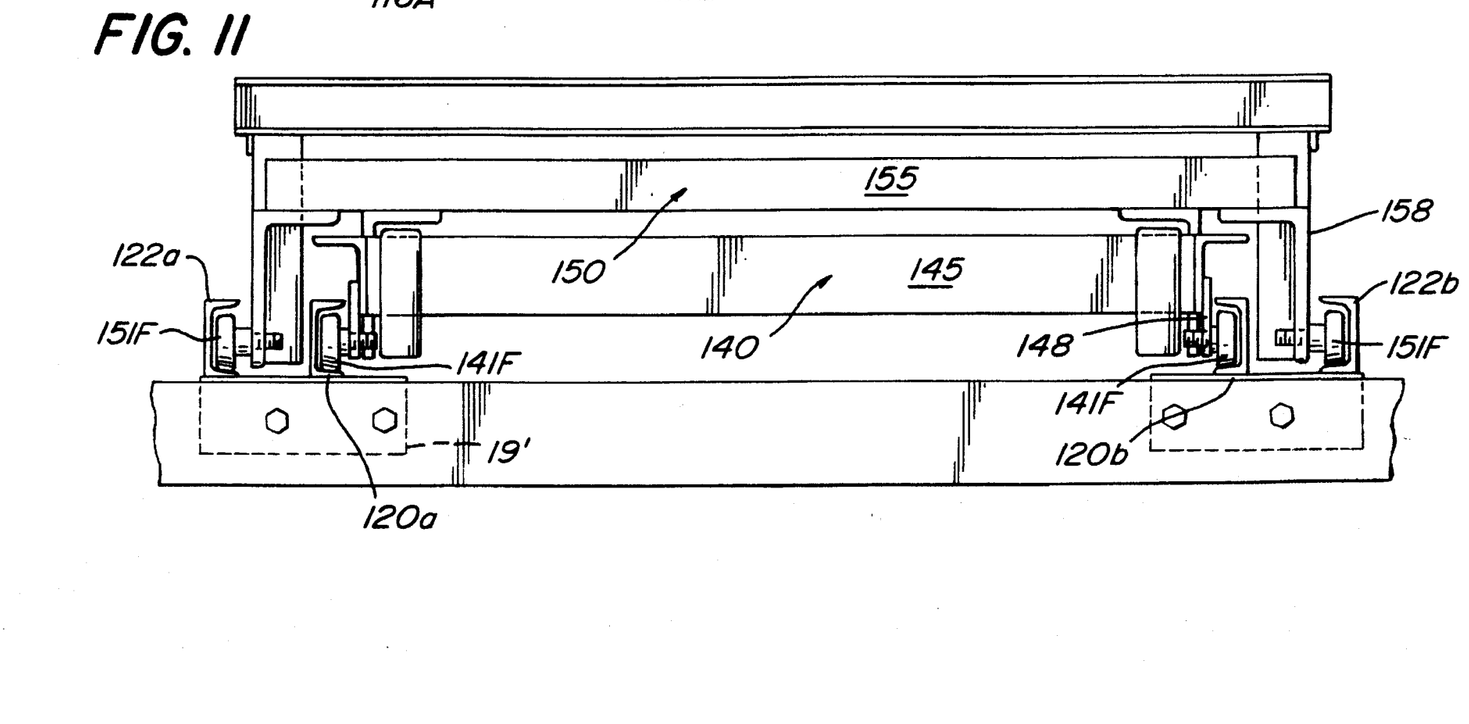
FIG. 11 is a front end view of FIG. 10.

For each row of stored pallets, there is provided an inner and outer pair of associated track means 121a, 121b and 122a, 122b extending from the front to the back of the storage bay along the depth thereof as is similar to the three deep system. Each pair of associated track means 121 and 122 is spaced apart across the width of the storage bay in the manner described above with respect to the embodiment shown in FIG. 1. As best shown in FIG. 11, each of the track means 121 and 122 is comprised of a structural member having an C-shaped cross-section and is supported and secured to the shelf beams in a manner similar to the FIG. 1 embodiment. Each of the C-shaped members forming a track means 121 or 122 is secured to a front shelf 115 by angle brackets 23 and associated bolts at two locations as described above with respect to the FIG. 1 embodiment. Also, the rear shelf beam 117 is mounted so that the C-shaped members forming the track means 121 and 122 run over the top thereof and are secured thereto by the use of a plate 117' that runs behind the associated C-shaped member and rear shelf beam 117 so as to provide a rear stop for the wheels of the carts riding thereon.

Further each adjacent but spaced apart inner and outer tracks is welded to a bracket 19' to form an independent unit 89 as depicted in FIG. 16B and then bolted to interior shelf beams 116A–C similar to the embodiment shown in FIG. 15.

In the four deep system in accordance with the invention shown in FIGS. 8–14, there are provided a lower cart 140, a middle cart 150, and an upper carts 70 which are adapted to ride on the track means comprising the two pairs of tracks 121a, 121b and 122a, 122b, as discussed above, for movement along the depth of the storage bay as will be described in detail hereafter. Briefly stated, each of the carts 140, 150, 70 is mounted for movement along the track means between a forward position and a back position. Referring to FIG. 8, the forward position of each of the carts 140, 150, 70 is shown in the left hand row of the storage bay shown in this figure, and the back positions of the carts is shown in the right hand row of the storage bay shown in this figure.

Figure 12:
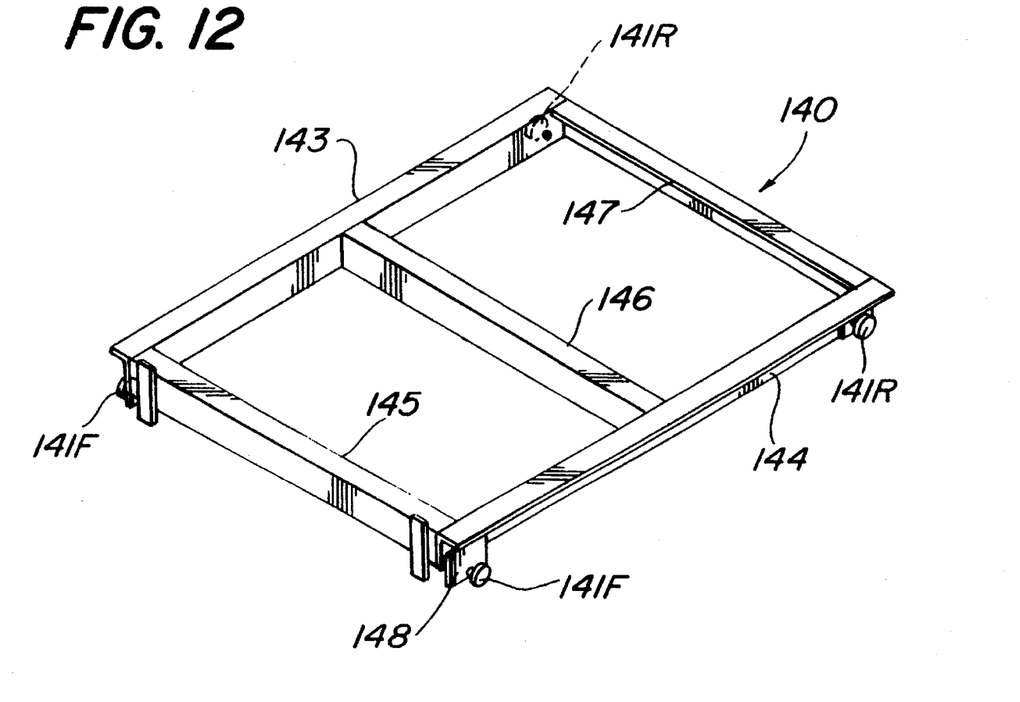
FIGS. 12, 13 and 14 are detail views.

The lower cart 140 is similar to the lower cart 40 of the three deep system including a rectangular frame formed of a plurality of structural members welded together as best shown in FIG. 12. The frame of cart 140 comprises a pair of side structural angles 143 and 144, a front structural angle 145, a middle structural angle 146, and a rear structural angle 147. Middle angle 146 and rear angle 147 extend between and are welded at their ends to side angles 143 and 144. Two pairs of vertical plates 148 are welded to the inner ends of side angle 45 in an arrangement shown in FIG. 12 to provide each pair for supporting their respective front and rear wheel assemblies 141F and 141R of cart 140.

There are provided two bearing-type wheel assemblies mounted on each side of the front frame at the front and rear ends thereof to provide four rolling supports for cart 140, the front wheel assembly on each side being indicated at 141F and the rear wheel assembly being indicated at 141R. The construction of the wheel assemblies 141F and 141R and their mounting on the first cart frame will be described more fully hereafter. As best shown in FIG. 11, the front and rear wheels 141F, 141R ride on the inwardly facing tapered bottom flange portions of the C-shaped structural member forming the inner tracks 121a, 121b. The frame for cart 140 is of a size so as to support a pallet load, as indicated by the pallet load B in the arrangement shown in FIG. 10.

Figure 9:
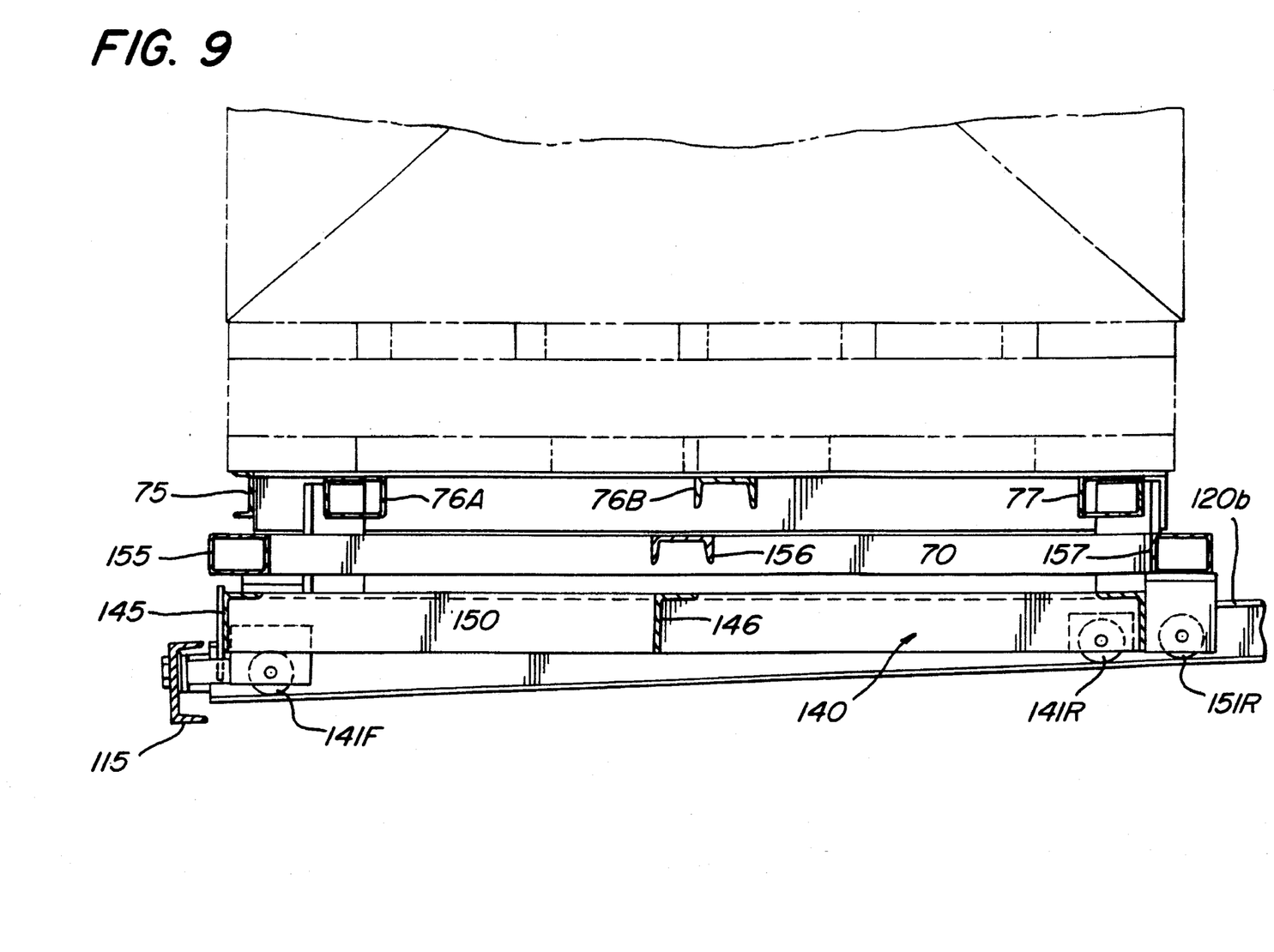
FIG. 9 is a section taken on line 8—8 of FIG. 8.
Figure 13:
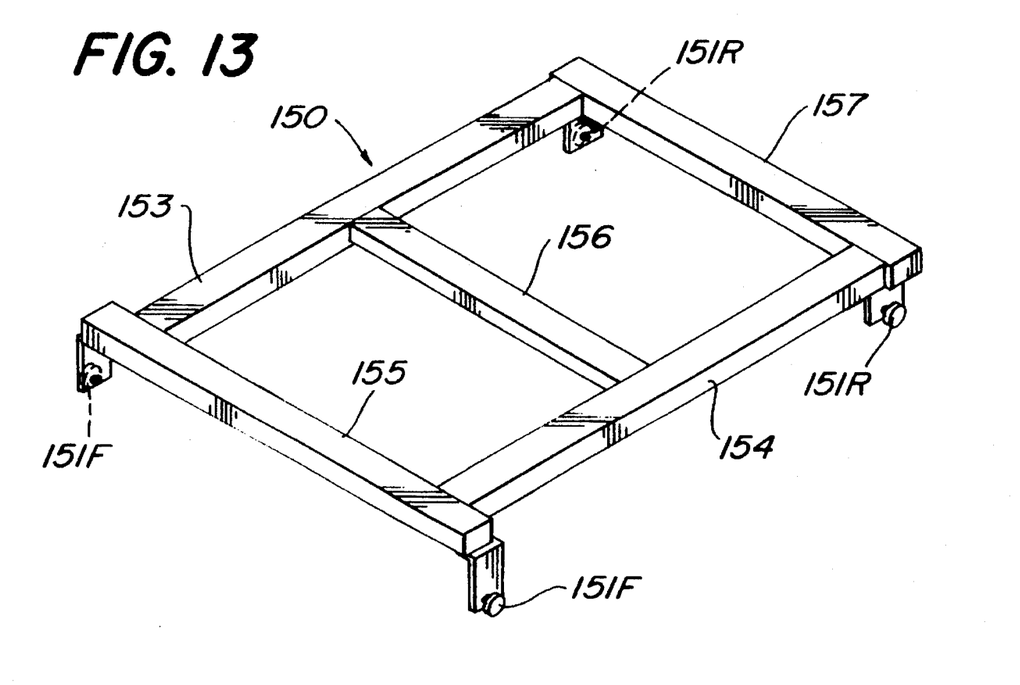

The middle or second cart 150 is manufactured as an independent unit and includes a rectangular frame for providing support for a loaded pallet, a plurality of wheel assemblies 151F and 151R on each side of the cart frame, and means for supporting each of the wheel assemblies 151F, 151R to make rolling contact with the outer tracks 122a, 122b as cart moves along the depth of the storage bay between a forward and a back position. Second cart 150 includes a rectangular frame formed of five structural members welded together as best shown in FIG. 13. Cart 150 comprises a pair of side tubes 153 and 154, a front tube 155, a middle channel and rear tube 157. A pair of bearing-type wheel assemblies 151F and 151R are mounted at ends of the front and rear tubes 155 and 157 so as to provide four rolling supports for the second cart 150. The front wheel assemblies 151F ride on the inwardly facing tapered bottom flange portions of the C-shaped structural members forming the pair of outer tracks 122a, 122b at locations rearwardly of the front wheel assemblies 141F of the first cart 140 as shown in FIG. 9. The rear wheel assemblies 151R ride on the inwardly facing tapered bottom flange portions of the C-shaped structural members forming the pair of inner tracks 121a, 121b at locations rearwardly of the rear wheel assemblies 141R of the first cart as shown in FIG. 9. The frame for cart 150 is of a size so as to be able to support a pallet load as indicated by the pallet load C in the arrangement shown in FIG. 10.

Figure 10:
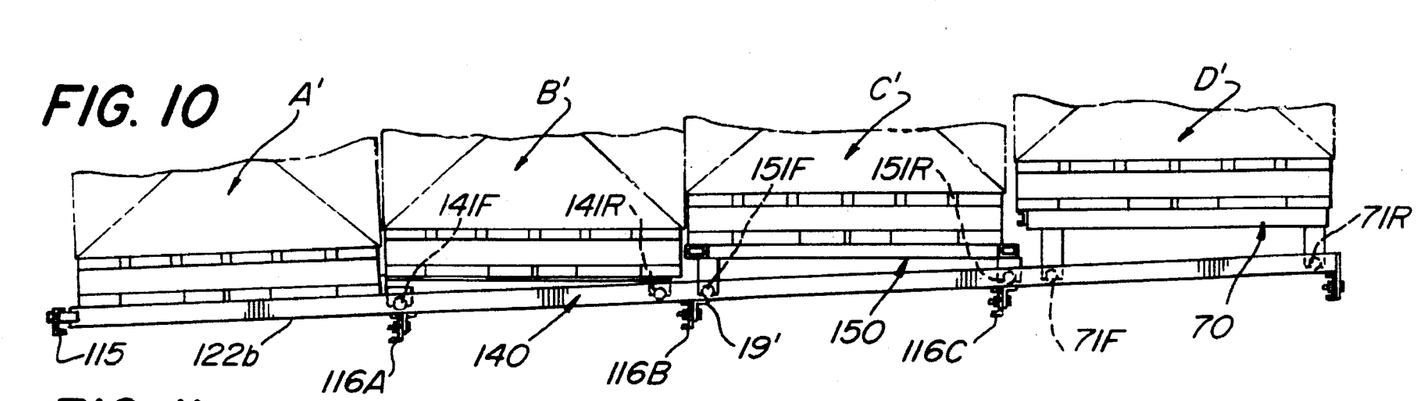
FIG. 10 is a side elevational view of FIG. 8.
Figure 14:
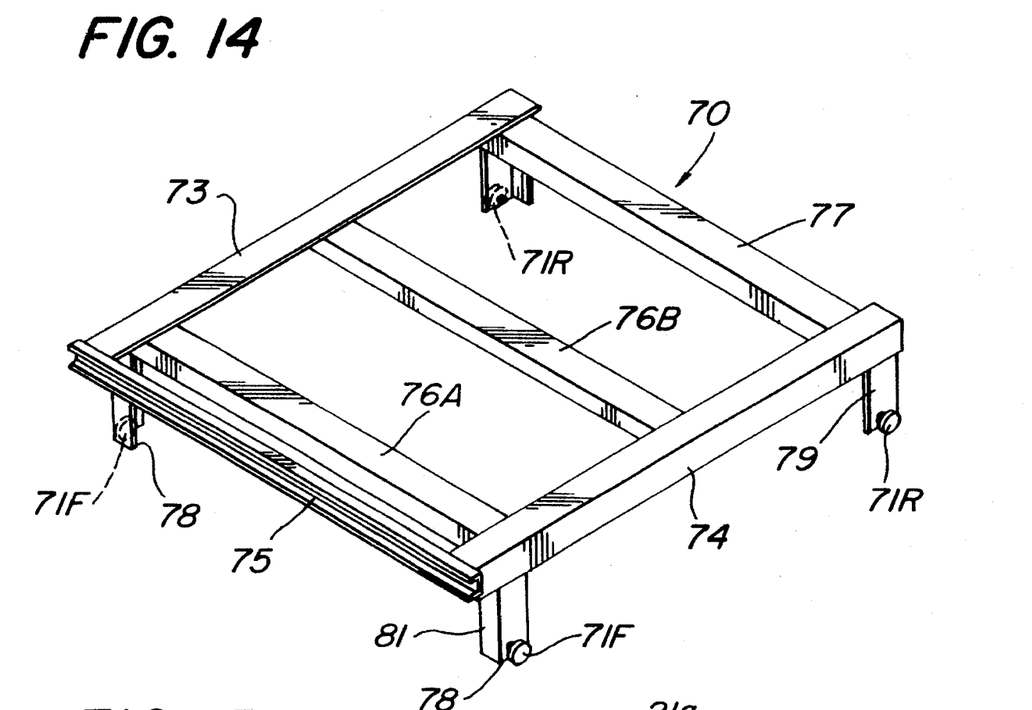

The third cart 70, which may be termed the upper cart, is manufactured as an independent unit and includes a rectangular frame for providing a support for a loaded pallet, a plurality of wheel assemblies 71F and 71R on each side of the cart frame and means for supporting each of the wheel assemblies 71F, 71R to make rolling contact with the second or outer tracks 122a, 122b as cart 70 moves along the depth of the storage bay between a forward and a back position. Second cart 70 includes a rectangular frame formed of six structural members welded together as best shown in FIG. 14. Cart 70 comprises a pair of side angles 73 and 74, a front channel 75, a pair of middle members, i.e. tube 76A and channel 76B, and a rear tube 77. A pair of bearing-type wheel assemblies 71F and 71R are mounted at the front and rear ends of side angles 73 and 74 so as to provide four rolling supports for fourth cart 70. To this end, a pair of angle brackets 78 are welded to the downwardly extending legs of side angles 73 and 74 in an arrangement as best shown in FIG. 14 to provide a downwardly extending leg portion at each end of the tube for supporting the outwardly facing front wheel assemblies 71F of cart 70. The front leg 81 of the angle bracket is positioned in slightly frontward of the front wheels 71F to prevent the front wheels 71F from hitting the front wheels 151F of the middle cart 150 and damaging them. Also, a pair of angle brackets 79 are welded to the downwardly extending legs of angles 73 and 74 in an arrangement as best shown in FIG. 14 to provide a downwardly extending leg portion at each end of the rear tube 77 for supporting outwardly facing rear wheel assemblies 71R of cart 70. As best shown in FIGS. 10, 14 by this construction the front wheel assemblies 71F are mounted to be spaced rearwardly a short distance from the front end of cart 70 for a purpose which will be described more fully hereafter. The third cart wheel assemblies 71F and 71R are arranged to ride on the inwardly facing tapered bottom flange portion of the C-shaped structural members forming the outer tracks 122a, 122b at locations rearwardly of the front wheel assemblies 151F of the second or middle cart 150 as shown in FIG. 9. The frame for cart 70 is of a size so as to be able to support a pallet load D' in the arrangement shown in FIG. 9.

The wheel assemblies for the carts 140, 150 and 70 are similar to the wheel assemblies for cart 40 as previously described. Each of the carts 40 and 70 is mounted into their associated tracks 121a, 121b and 122a, 122b in a conventional manner by the use of a pair of cut-outs formed in the upper flanges of the structural members forming said associated tracks. As is conventional, the cut-outs are located to correspond to the spacing of the wheel assemblies of said carts. Actual field insertion is achieved by a procedure well known in the art whereby the carts are tilted at an angle and the left-side wheels are slipped into the left hand tracks and the cart is maneuvered so that the right-side cart wheels can then be dropped through the track cut-outs in the upper flanges of the track means.

In accordance with the invention, cart 140 is arranged so that its front and rear wheel assemblies 141F and 141R ride on the inner tracks 121a, 121b as cart 140 moves between a forward position at the entry end of the storage bay and a back position two pallets deep from the entry end of the storage bay. Cart 150 is arranged so that its front wheel assemblies 151F ride on the outer tracks 122a, 122b and the rear wheel assemblies ride on the inner tracks 121a, 121b as cart 150 moves between a forward position at the entry end of the storage bay and a back position three pallets deep from the entry end of the storage bay.

The carts 140, 150, and 70 are constructed and arranged so that the forward position of cart 150 overlies the forward position of cart 140, and the forward position of cart 70 overlies the forward position of carts 140 and 150. carts 70 and 150 are in the forward positions thereof. It is noted that the rear wheel assemblies 151R of cart 150 are positioned to avoid contact with the rear wheel assemblies 141R of cart 140 when the carts 140 and 150 are in the forward positions thereof in order to ensure that the carts can be positioned at the proper forward position at the front shelf 15.

As described in said prior patents, there are provided suitable bumper means for holding the carts 140, and 150 in their forward position at the entry end of the storage bay.

The pairs of tracks 121a, 121b and 122a, 122b are all mounted on the shelf beams of the framework so that they extend at a slight inclination toward the entry end of the storage bay. As is described in detail in said prior patents, the inclination is achieved by the accurate locating of the position of the supporting structure for the tracks means and is typically about 5/16 inch for each 12 inches of length.

Carts 140, 150 and 70 are constructed so that the pallet supporting top surface of each cart is maintained in a level (i.e., horizontal) position on the inclined track means for said carts. This type of cart construction is described in detail in said U.S. Pat. No. 4,955,489 with respect to FIGS. 18–19 thereof. Briefly, this is achieved by making the front wheel assemblies of a larger vertical extent than the rear wheel assemblies for each cart. In other words, the support means for the front wheel assemblies are constructed and arranged so that the front end of the top surface of the cart is spaced from the place of rolling contact with the track an amount greater than that of the rear end thereof so that said top supporting surface is maintained in a horizontal plane while a cart supported on the inclined tracks 121a, 121b and 122a, 122b rides therealong. Thus, the supporting surface of the cart remains level even though the cart moves along an inclination as it moves between its forward and back positions on the inclined tracks supporting the same.

As is apparent from a consideration of the Drawings, the forward position of the carts 140, 150 and 70 is located at the entry end of the storage bay, the back position of the first cart 140 being two pallets deep from the entry end of the storages bay, the back position of the second cart 150 being three pallets deep from the entry end of the storage bay, and the back position of the third cart 70 being four pallets deep from the entry end of the storage bay. Thus, each row of the storage bay can store four pallet loads A', B', C', and D' in an arrangement as best shown in FIGS. 9 and 10. The front pallet supporting load A' is supported on the track means on the inner pair of tracks 121a, 121b, the pallet supporting load B' is supported on the first cart 140, the pallet supporting load C' is supported on the second cart 150, and the pallet supporting load D' is supported on the third cart 70.

The pallets load A', B', C', and D' will be placed in the position shown in FIGS. 9, 10 by a conventional push-back loading technique in the same manner as described with respect to the three deep embodiment shown in FIGS. 1–7.

This invention has been described by reference to precise embodiments, but it will be appreciated by those skilled in the art that this invention is subject to various modifications and to the extent that those modifications would be obvious to one of ordinary skill they are considered as being within the scope of the appended claims.

What is claimed is:

1. A storage rack for supporting pallet loads multiple pallets deep having a framework providing a plurality of storage bays each of which is defined by a plurality of vertical uprights and horizontal shelf beams, wherein at least one of said storage bays comprises:

a plurality of carts, track means extending along the depth of said storage bay for supporting said carts for movement along said track means from forward positions to back positions thereof, said track means comprising:

a first pair of parallel track members having cart supporting portions extending from front to back along the depth of said storage bay and being spaced apart across the width of the storage bay, a second pair of parallel track members having cart supporting portions extending from front to back along the depth of said storage bay and being spaced apart across the width of the storage bay, said first pair of track members being located inwardly of said second pair of track members, said first and second pairs of track members being arranged to face inwardly, said plurality of carts including a first cart including a frame providing support for a pallet load, front and rear wheel assemblies on each side of said first cart frame, and means for supporting each of said first cart wheel assemblies to make rolling contact with one of said tracks of said track means as said first cart moves along the depth of the storage bay between a forward position and a back position, a second cart including a frame providing support for a loaded pallet, front and rear wheel assemblies on each side of said second cart frame, and means for supporting each of said second cart wheel assemblies to make rolling contact with one of said track means as said second cart moves along the depth of the storage bay between a forward and a back position, the front and rear wheel assemblies of said first cart being constructed and arranged to make rolling contact with said first tracks, the front and rear wheel assemblies of said second cart being constructed and arranged to make rolling contact with said second tracks, said track means being mounted on the storage bay framework so as said track means are inclined toward the entry end of said storage bay, whereby said carts are supported so that they tend to roll along said track means toward the entry end of said storage bay.

2. A storage rack according to claim 1 wherein the forward position of said first cart is located at the entry end of the storage bay and the back position of said first cart is located two pallets deep from the entry end of the storage bay, the forward position of said second cart overlying the forward position of said first cart and the back position of said second cart being located three pallets deep from the entry end of the storage bay.

3. A storage rack according to claim 1 wherein said front and rear wheels of said second cart are adapted to ride on said second tracks at locations rearwardly of said front wheel assemblies of said first cart.

4. A storage rack according to claim 1 wherein each of said first and second tracks is formed by a structural member having a C-shaped cross section.

5. A storage rack for supporting pallet loads multiple pallets deep having a framework providing a plurality of storage bays each of which is defined by a plurality of vertical uprights and horizontal shelf beams, wherein at least one of said storage bays comprises:

a plurality of carts, track means extending along the depth of said storage bay for supporting said carts for movement along said track means from forward positions to back positions thereof, said track means comprising:

a first pair of parallel track members having cart supporting portions extending from front to back along the depth of said storage bay and being spaced apart across the width of the storage bay, a second pair of parallel track members having cart supporting portions extending from front to back along the depth of said storage bay and being spaced apart across the width of the storage bay, said first pair of track members being located inwardly of said second pair of track members, said plurality of carts including a first cart including a frame providing support for a pallet load, front and rear wheel assemblies on each side of said first cart frame, and means for supporting each of said first cart wheel assemblies to make rolling contact with one of said tracks of said track means as said first cart moves along the depth of the storage bay between a forward position and a back position, a second cart including a frame providing support for a loaded pallet, front and rear wheel assemblies on each side of said second cart frame, and means for supporting each of said second cart wheel assemblies to make rolling contact with one of said track means as said second cart moves along the depth of the storage bay between a forward and a back position, the front and rear wheel assemblies of said first cart being constructed and arranged to make rolling contact with said first tracks, the front wheel assemblies of said second cart being constructed and arranged to make rolling contact with said second tracks, and the rear wheel assemblies of said first cart being constructed and arranged to make rolling contact with said first tracks, and a third cart including a frame providing support for a pallet load, front and rear wheel assemblies on each side of said third cart frame, and means for supporting each of said third cart wheel assemblies to make rolling contact with one of said tracks of said track means as said third cart moves along depth of the storage bay between a forward and a back position, the front and rear wheel assemblies of said third cart being constructed and arranged to make rolling contact with said second tracks, said track means being mounted on the storage bay framework so as said track means are inclined toward the entry end of said storage bay, whereby said carts are supported so that they tend to roll along said track means toward the entry end of said storage bay.

6. A storage rack according to claim 5 wherein the forward position of said first cart is located at the entry end of the storage bay and the back position of said first cart is located two pallets deep from the entry end of the storage bay, the forward position of said second cart overlying the forward position of said first cart and the back position of said second cart being located three pallets deep from the entry end of the storage bay.

7. A storage rack according to claim 5 wherein said front wheel assemblies of said second cart are adapted to ride on said second tracks at locations rearwardly of said front wheel assemblies of said of said first cart.

8. A storage rack according to claim 7 wherein said rear wheel assemblies of said second cart are adapted to ride on said first tracks.

9. A storage rack according to claim 5 wherein the forward position of said third cart overlies the forward position of said second cart at the entry end of the storage bay and the back position of said third cart is located four pallets deep from the entry end of the storage bay.

10. A storage rack according to claim 5 wherein each of said first and second tracks is formed by a structural member having a C-shaped cross section.

11. A storage rack according to claim 5 wherein said front wheel assemblies of said third cart includes a support leg positioned in front of said front wheel assemblies, said support leg being constructed and arranged to prevent said front wheel assemblies of said second and third carts form contacting each other when said third and second carts are in their forward positions.

12. A storage rack for supporting pallet loads multiple pallets deep having a framework providing a plurality of storage bays each of which is defined by a plurality of vertical uprights and horizontal shelf beams, wherein at least one of said storage bays comprises:

a plurality of carts, track means extending along the depth of said storage bay for supporting said carts for movement along said track means from forward positions to back positions thereof, said track means comprising:

a first pair of parallel track members having cart supporting portions extending from front to back along the depth of said storage bay and being spaced apart across the width of the storage bay, a second pair of parallel track members having cart supporting portions extending from front to back along the depth of said storage bay and being spaced apart across the width of the storage bay, said first pair of track members being located inwardly of said second pair of track members, means for securing one of said first pair of track members to an adjacent one of said second track members to form a first independent track unit, means for securing the other one of said first pair of track members to an adjacent one of said second track members to form a second independent track unit, means for mounting each of said first and second track unit on said horizontal shelf beam, said plurality of carts including a first cart including a frame providing support for a pallet load, front and rear wheel assemblies on each side of said first cart frame, and means for supporting each of said first cart wheel assemblies to make rolling contact with one of said tracks of said track means as said first cart moves along the depth of the storage bay between a forward position and a back position, a second cart including a frame providing support for a loaded pallet, front and rear wheel assemblies on each side of said second cart frame, and means for supporting each of said second cart wheel assemblies to make rolling contact with one of said track means as said second cart moves along the depth of the storage bay between a forward and a back position, the front and rear wheel assemblies of said first cart being constructed and arranged to make rolling contact with said first tracks, the front and rear wheel assemblies of said second cart being constructed and arranged to make rolling contact with said second tracks, each of said first and second independent units being mounted on the storage bay framework so as said track means are inclined toward the entry end of said storage bay, whereby said carts are supported so that they tend to roll along said track means toward the entry end of said storage bay.

13. A storage rack according to claim 12 wherein said securing means of said first and second track members of a said independent unit includes a plurality of brackets, each bracket extending between said track members and spaced apart the length of said track members.

14. A storage rack according to claim 12 wherein said mounting means includes a plurality of bolts extending through the bracket and horizontal shelf beam.

15. A storage rack according to claim 12 wherein the forward position of said first cart is located at the entry end of the storage bay and the back position of said first cart is located two pallets deep from the entry end of the storage bay, the forward position of said second cart overlying the forward position of said first cart and the back position of said second cart being located three pallets deep from the entry end of the storage bay.

16. A storage rack according to claim 12 wherein said front and rear wheels of said second cart are adapted to ride on said second tracks at locations rearwardly of said front wheel assemblies of said first cart.

17. A storage rack according to claim 12 wherein each of said first and second tracks is formed by a structural member having a C-shaped cross section.

18. A storage rack according to claim 12 wherein each of said first and second tracks are arranged to face inwardly.

19. A storage rack for supporting pallet loads multiple pallets deep having a framework providing a plurality of storage bays each of which is defined by a plurality of vertical uprights and horizontal shelf beams, wherein at least one of said storage bays comprises:

a plurality of carts, track means extending along the depth of said storage bay for supporting said carts for movement along said track means from forward positions to back positions thereof, said track means comprising:

a first pair of parallel track members having cart supporting portions extending from front to back along the depth of said storage bay and being spaced apart across the width of the storage bay, a second pair of parallel track members having cart supporting portions extending from front to back along the depth of said storage bay and being spaced apart across the width of the storage bay, said first pair of track members being located inwardly of said second pair of track members, means for securing one of said first pair of track members to an adjacent one of said second track members to form a first independent track unit, means for securing the other one of said first pair of track members to an adjacent one of said second track members to form a second independent track unit, means for mounting each of said first and second track units on said horizontal shelf beam, said plurality of carts including a first cart including a frame providing support for a pallet load, front and rear wheel assemblies on each side of said first cart frame, and means for supporting each of said first cart wheel assemblies to make rolling contact with one of said tracks of said track means as said first cart moves along the depth of the storage bay between a forward position and a back position, a second cart including a frame providing support for a loaded pallet, front and rear wheel assemblies on each side of said second cart frame, and means for supporting each of said second cart wheel assemblies to make rolling contact with one of said track means as said second cart moves along the depth of the storage bay between a forward and a back position, the front and rear wheel assemblies of said first cart being constructed and arranged to make rolling contact with said first tracks, the front wheel assemblies of said second cart being constructed and arranged to make rolling contact with said second tracks, and the rear wheel assemblies of said first cart being constructed and arranged to make rolling contact with said first tracks, and a third cart including a frame providing support for a pallet load, front and rear wheel assemblies on each side of said third cart frame, and means for supporting each of said third cart wheel assemblies to make rolling contact with one of said tracks of said track means as said third cart moves along depth of the storage bay between a forward and a back position, the front and rear wheel assemblies of said third cart being constructed and arranged to make rolling contact with said second tracks, said independent unit being mounted on the storage bay framework so as said track means are inclined toward the entry end of said storage bay, whereby said carts are supported so that they tend to roll along said track means toward the entry end of said storage bay.

20. A storage rack according to claim 19 wherein said securing means of said first and second track members of a said independent unit includes a plurality of brackets, each bracket extending between said track members and spaced apart the length of said track members.

21. A storage rack according to claim 19 wherein said mounting means includes a plurality of bolts extending through the bracket and horizontal shelf beam.

22. A storage rack according to claim 19 wherein the forward position of said first cart is located at the entry end of the storage bay and the back position of said first cart is located two pallets deep from the entry end of the storage bay, the forward position of said second cart overlying the forward position of said first cart and the back position of said second cart being located three pallets deep from the entry end of the storage bay.

23. A storage rack according to claim 19 wherein said front wheel assemblies of said second cart are adapted to ride on said second tracks at locations rearwardly of said front wheel assemblies of said of said first cart.

24. A storage rack according to claim 23 wherein said rear wheel assemblies of said second cart are adapted to ride on said first tracks.

25. A storage rack according to claim 19 wherein the forward position of said third cart overlies the forward position of said second cart at the entry end of the storage bay and the back position of said third cart is located four pallets deep from the entry end of the storage bay.

26. A storage rack according to claim 19 wherein each of said first and second tracks is formed by a structural member having a C-shaped cross section.

27. A storage rack according to claim 19 wherein each of said first and second tracks is arranged to face inwardly.

28. A storage rack according to claim 19 wherein said front wheel assemblies of said third cart includes a support leg positioned in front of said front wheel assemblies, said support leg being constructed and arranged to prevent said front wheel assemblies of said second and third carts form contacting each other when said third and second carts are in their forward positions.

* * * * *